(12) United States Patent
Itano et al.

(10) Patent No.: US 8,351,346 B2
(45) Date of Patent: Jan. 8, 2013

(54) COMMUNICATION DEVICE

(75) Inventors: Seiho Itano, Tokyo (JP); Yasuhiro Sugawara, Tokyo (JP)

(73) Assignee: Allied Telesis Holdings K.K., Tokyo (JP)

( * ) Notice: Subject to any disclaimer, the term of this patent is extended or adjusted under 35 U.S.C. 154(b) by 320 days.

(21) Appl. No.: 12/746,523

(22) PCT Filed: Oct. 20, 2008

(86) PCT No.: PCT/JP2008/068968
§ 371 (c)(1),
(2), (4) Date: Jun. 5, 2010

(87) PCT Pub. No.: WO2009/072356
PCT Pub. Date: Jun. 11, 2009

(65) Prior Publication Data
US 2010/0260058 A1    Oct. 14, 2010

(30) Foreign Application Priority Data
Dec. 7, 2007  (JP) .................................. 2007-317667

(51) Int. Cl.
*H04L 12/26*    (2006.01)
(52) U.S. Cl. ...................................................... 370/252
(58) Field of Classification Search .................. None
See application file for complete search history.

(56) References Cited

U.S. PATENT DOCUMENTS

| | | |
|---|---|---|
| 6,141,568 A | 10/2000 | Sakaguchi |
| 2002/0196736 A1 | 12/2002 | Jin |
| 2003/0148760 A1 | 8/2003 | Takayanagi |
| 2003/0191854 A1 | 10/2003 | Hsu et al. |
| 2006/0038506 A1 | 2/2006 | Rose et al. |
| 2007/0257900 A1* | 11/2007 | Schulz .......................... 345/211 |

FOREIGN PATENT DOCUMENTS

JP    H10-224289    8/1998
(Continued)

OTHER PUBLICATIONS

Blanquicet, F., et al., "An Initial Performance Evaluation of Rapid PHY Selection (RPS) for Energy Efficient Ethernet", "32nd IEEE Conference on Local Computer Networks, Dublin, Ireland", Oct. 15-18, 2007, pp. 223-225, IEEE Communications Society.

(Continued)

Primary Examiner — Chirag Shah
Assistant Examiner — Minh-Trang Nguyen
(74) Attorney, Agent, or Firm — Hultquist, PLLC; Frank J. Bozzo

(57) ABSTRACT

A communication device capable of improving power saving is provided. A communication device (1) includes a communication port (10); communication monitoring sections (18, 22) for controlling information communication using the communication port, a status indicating section (12) having one or more status indicators, a status indicator driving section (20) for controlling a drive signal which detects a communication status from the communication monitoring sections and is supplied to the status indicating section on the basis of the communication status, and a lighting control section (24) for detecting the communication status from the communication monitoring sections and outputting a control signal to the status indicator driving section if the communication status changes from a first status to a second status. The status indicator driving section controls the drive signal so as to turn off the status indicators when the control signal is outputted from the lighting control section.

8 Claims, 5 Drawing Sheets

FOREIGN PATENT DOCUMENTS

| | | |
|---|---|---|
| JP | 2001-352333 | 12/2001 |
| JP | 2002-032159 | 1/2002 |
| JP | 2002-347200 | 12/2002 |
| JP | 2003-037545 | 2/2003 |
| JP | 2004-274102 | 9/2004 |
| JP | 2004-348186 | 12/2004 |
| JP | 2007-088668 | 4/2007 |
| JP | 2007-208578 | 8/2007 |

OTHER PUBLICATIONS

Gupta, M., et al., "Dynamic Ethernet Link Shutdown for Energy Conserviation on Ethernet Links", "Proceedings of IEEE International Conference on Communications, Glasgow, UK", Jun. 24-28, 2007, pp. 6156-6161, IEEE Communications Society.

* cited by examiner

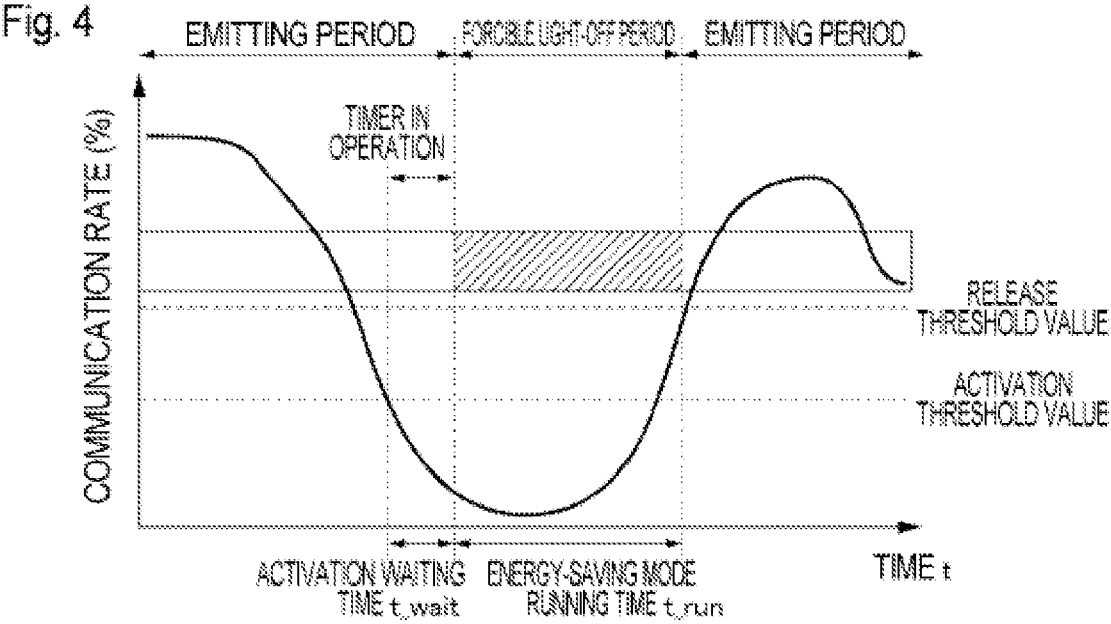
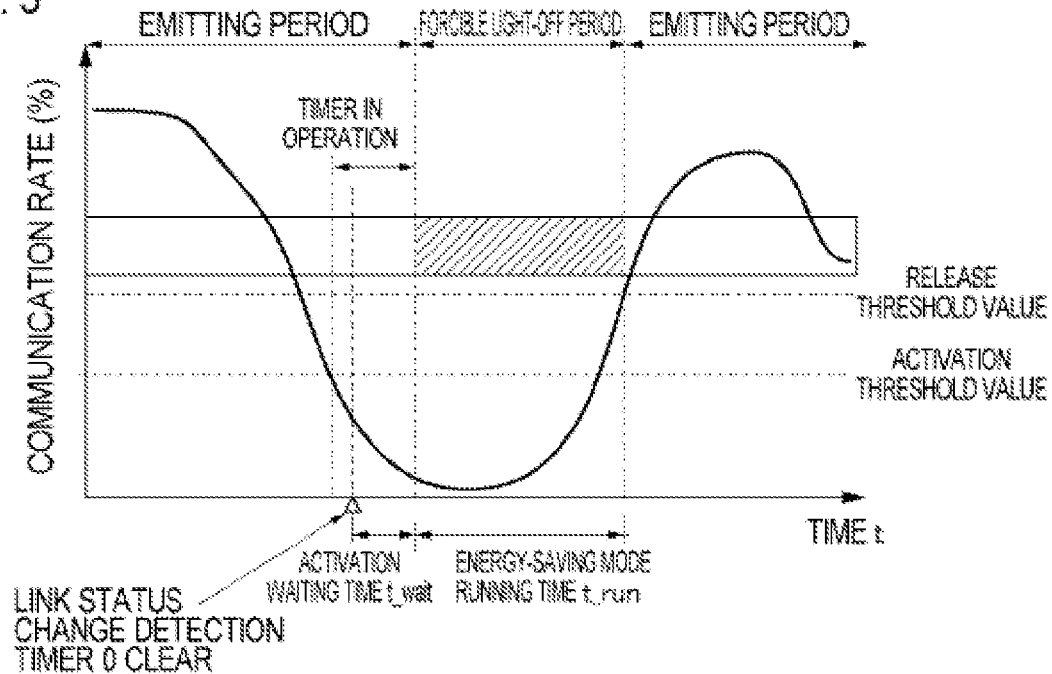

COMMUNICATION DEVICE

CROSS-REFERENCE TO RELATED APPLICATIONS

This is a U.S. national phase under 35 U.S.C. §371 of International Application No. PCT/JP08/68968 filed Oct. 20, 2008, which in turn claims priority of Japanese Patent Application No. 2007-317667 filed Dec. 7, 2007. The disclosures of such international application and Japanese priority patent application are hereby incorporated herein by reference in their respective entireties, for all purposes.

TECHNICAL FIELD

This invention relates to a power-saving technique in communication devices such as switching hubs and routers.

BACKGROUND ART

Communication devices (network equipment) such as switching hubs and routers often comprise a status indicator (e.g., LED) for indicating the operational status of the device itself. Such status indicators, for example, are recognized visually as the operational status of the communication device by the user (e.g., network administrator). However, in general, it is rare that the user constantly monitors the operational status of the communication device. If the status indicator of the communication device operates even while the user is not specifically performing monitoring of the status, power is consumed, and this is undesirable from the perspective of power-saving (energy-saving).

Prior art to this application includes, for example, JP10-224289 A (patent document 1), JP2003-037545 A (patent document 2) and JP2002-347200 A (patent document 3), which disclose the technique relating to power-saving in, for example, mobile phones or mobile communication terminals. However, prior art disclosed in these documents relates to turning off the light when communication is not busy or in a standby mode. There is nothing that discloses or suggests a communication device capable of power-saving, for example, by appropriately turning off the status indicator during communication as well.

Patent document 1: JP10-224289 A
Patent document 2: JP2003-037545 A
Patent document 3: JP2002-347200 A

DISCLOSURE OF THE INVENTION

Problem To Be Solved By the Invention

An object of this invention is to provide a communication device capable of power-saving (energy-saving) and a control technique thereof.

Solution to the Problem

A communication device of an aspect according to this invention includes: one or more communication ports; a communication monitoring section that monitors information communication through the communication port; a status indicating section including one or more status indicators; a status indicator driving section that controls a drive signal to be supplied to the status indicating section based on the communication status detected by the communication monitoring section; and a lighting control section that outputs a control command (control signal) to the status indicator driving section when a change in the communication status (for example, a change from a first status to a second status) is detected by the communication monitoring section, and is characterized in that the status indicator driving section controls the drive signal so as to turn off the status indicator when the control command is provided from the lighting control section.

Moreover, the status indicator driving section may control the drive signal so as to relatively decrease the luminance of the status indicator when the control command is provided from the lighting control section.

Preferably, the communication status includes a communication rate, the first status is a status in which the communication rate is higher than a first threshold value, and the second status is a status in which the communication rate is lower than the first threshold value.

Preferably, the communication status includes a link status, the first status corresponds to a status in which a link-up is detected, and the second status corresponds to a status in which a link-down is detected.

Preferably, the lighting control section starts a timer at a point when the communication status changes from the first status to the second status, and outputs the control command to the status indicator driving section when the timer exceeds a predetermined activation waiting time.

A method aspect of this invention relates to a driving method of a status indicating section in a communication device comprising one or more communication ports, a communication monitoring section that monitors information communication through the communication port, and a status indicating section including one or more status indicators, and is characterized by controlling a drive signal to be supplied to the status indicating section so as to turn off the light of the status indicator when a change in the communication status obtained by the communication monitoring section is detected.

The drive signal to be supplied to the status indication section may be controlled so as to relatively decrease the luminance of the status indicator when a change in the communication status obtained by the communication monitoring section is detected.

A method of another aspect of this invention is a driving method of a status indicating section in a communication device comprising one or more communication ports, a communication monitoring section that monitors an information communication through the one or more communication ports, a status indicating section including one or more status indicators, a status indicator driving section that drives the status indicating section and a lighting control section that outputs a control command to the status indicator driving section, the method comprising: a first step of the status indicator driving section detecting a communication status from the communication monitoring section and controlling a drive signal to be supplied to the status indicating section based on the communication status; a second step of the lighting control section obtaining the communication status from the communication monitoring section and outputting the control command to the status indicator driving section when a change in the communication status is detected; and a third step of the status indicator driving section controlling the drive signal so as to turn off the light of the status indicator when the control command is provided from the lighting control section.

Effect of the Invention

According to this invention, in response to the case when the communication status is changed (e.g., when the communication rate is decreased), the light of the status indicator of the status indicating section is turned off or is set to a relatively low luminance, such that a power-saving of a communication device is possible.

BRIEF DESCRIPTION OF THE DRAWINGS

FIG. 4 is a diagram explaining the relationship between a communication rate and the energy-saving mode.

FIG. 5 is a diagram explaining the relationship between the communication rate and the energy-saving mode.

DESCRIPTION OF REFERENCE NUMERALS

Figure 1:
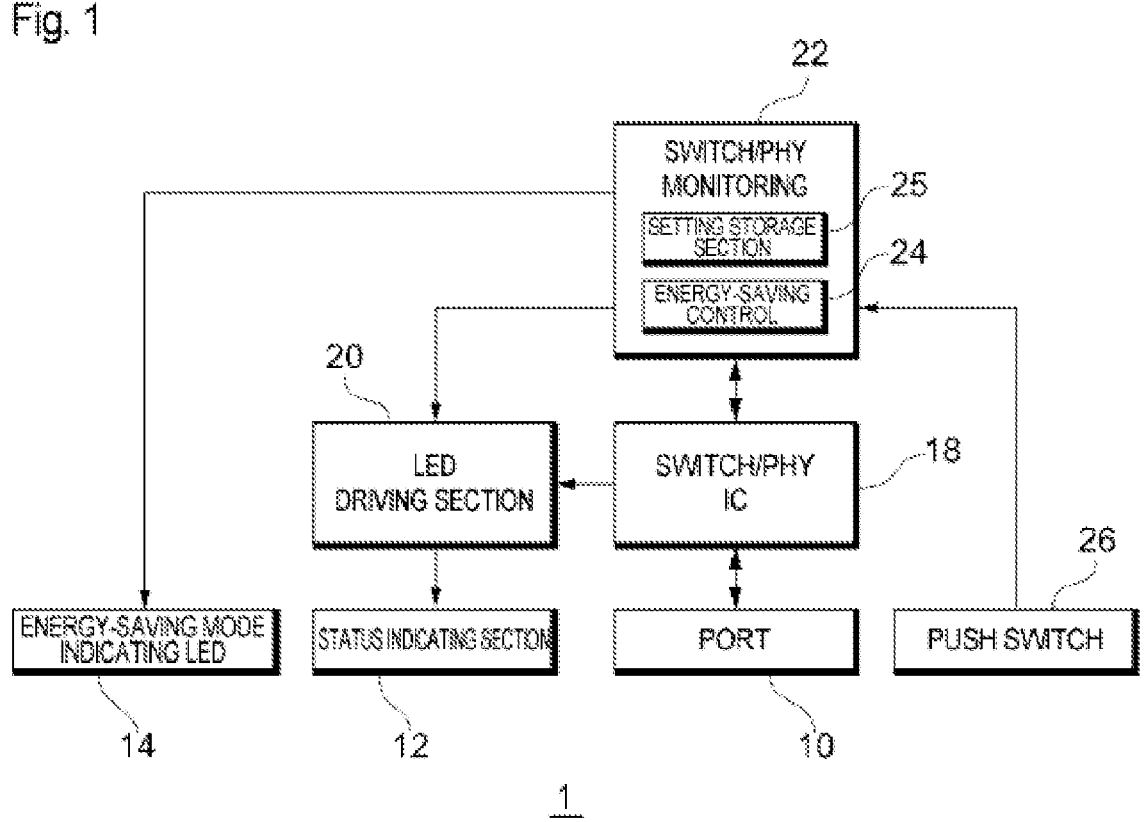
FIG. 1 is a block diagram showing a communication device.

1 . . . Communication device
10 . . . Communication port
12 . . . Status indicating section
14 . . . Energy-saving mode indicating LED
18 . . . Switch/PHY circuit
20 . . . LED driving section
22 . . . Switch/PHY monitoring section
24 . . . Energy-saving control section
25 . . . Setting storage section
26 . . . Push switch

BEST MODE FOR CARRYING OUT THE INVENTION

Embodiments of this invention will be described in detail below with reference to the drawings.

FIG. 1 is a block diagram of a communication device 1. As shown in FIG. 1, the communication device 1 includes a status indicating section 12 and an energy-saving mode indicating LED 14, as well as a Switch/PHY circuit (Switch/PHY IC) 18, LED driving section 20, Switch/PHY monitoring section 22, energy-saving control section 24, setting storage section 25 and PUSH switch 26. The Switch/PHY circuit 18 and LED driving section 20 are often integrally-constituted. The energy-saving control section 24 performs control relating to an energy-saving mode as will be described hereafter, and is built into the Switch/PHY monitoring section 22 in this embodiment. Similarly, in this embodiment, the setting storage section 25 is also built into the Switch/PHY monitoring section 22. The Switch/PHY monitoring section 22 monitors the status of the Switch/PHY circuit 18 based on the data indicating the current link status or communication volume of the communication port 10, which is passed from the Switch/PHY circuit 18. The push switch 26 is used for setting the energy-saving mode to be active or not.

In this embodiment, each LED of the status indicating section 12 corresponds to a "status indicator," the Switch/PHY circuit 18 and Switch/PHY monitoring section 22 correspond to a "communication monitoring section," the LED driving section 20 corresponds to a "status indicator driving section," and the energy-saving control section 24 corresponds to a "lighting control section."

Figure 2:
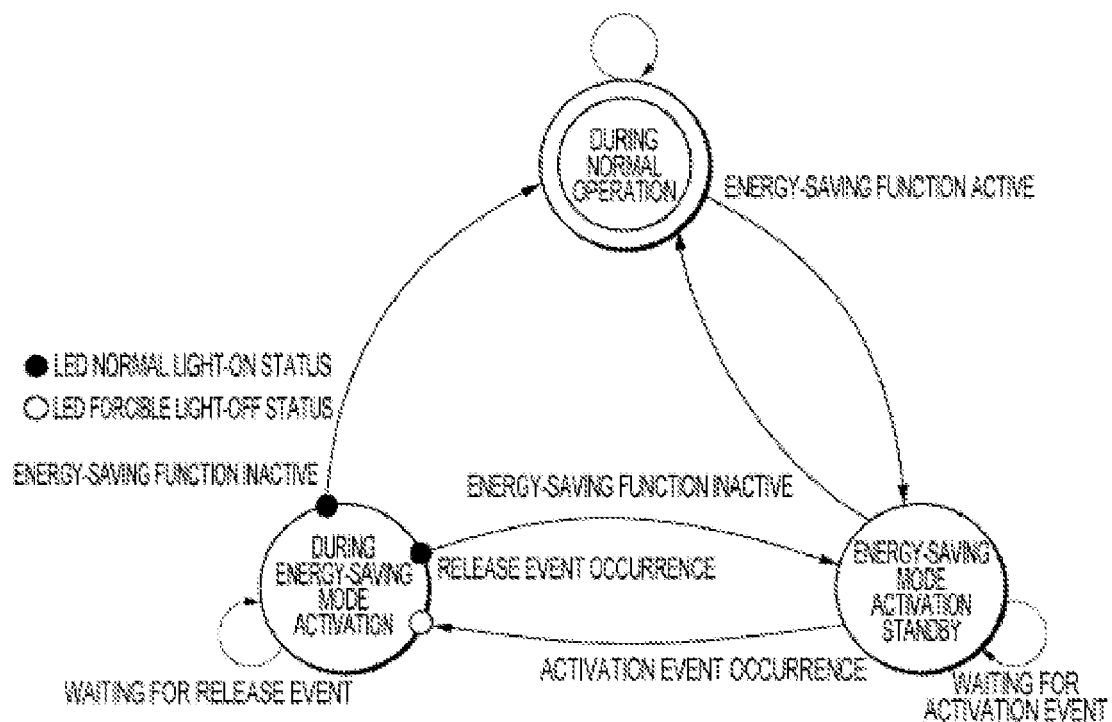
FIG. 2 is a status transition diagram relating to an energy-saving mode in a communication device.

FIG. 2 is a status transition diagram relating to an energy-saving mode in a communication device 1. The "energy-saving mode" refers to forcibly turning off the light of the status indicating section 12 when a certain condition (activation event) occurs. This energy saving mode is released when another condition (release event) occurs. Namely, the communication device 1 transitions the status from a "normal operation" to an "energy-saving mode activation standby" when the energy-saving mode is active. Then, the communication device 1 is turned to a status of waiting for a predetermined "activation event" (described hereafter), and with the occurrence of the "activation event," the status transitions to an "energy-saving mode activation" status. During this "energy-saving mode activation," the light of the status indicating section 12 is forcibly turned off, and the communication device 1 is turned to a status of waiting for a predetermined release event (described hereafter). When the "release event" occurs, the communication device 1 transitions to an "energy-saving mode activation standby" status, and the status indicating section 12 is turned to a normal lighting status. When the energy-saving mode is changed to be inactive, the status is transitioned from the "energy-saving mode activation" status to a "normal operation" status, and the status indicating section 12 is turned to a normal lighting status. The switching of the energy-saving mode can be performed using a push switch 26. The on/off setting of the energy-saving mode is stored in a setting storage section 25.

Figure 3:
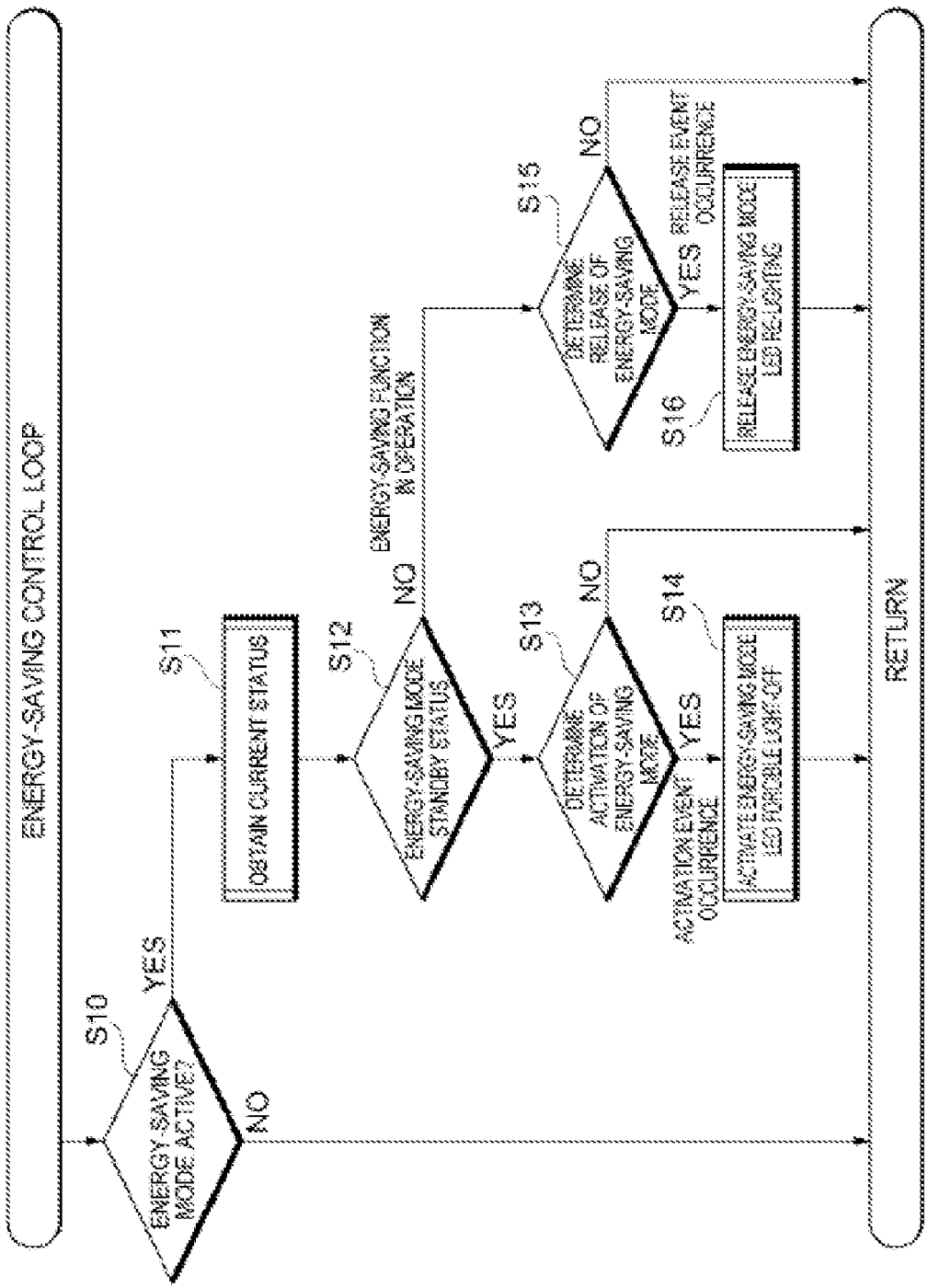
FIG. 3 is a flow chart showing an operational procedure of an energy-saving control in a communication device.

FIG. 3 is a flow chart showing an operational procedure of an energy-saving control in a communication device 1. The energy-saving control will be described below along with the flowchart.

The energy-saving control section 24 determines whether or not the energy-saving mode is currently active (step S10). Specifically, for example, the energy-saving control section 24 has a flag indicating an energy-saving mode when the energy-saving mode is active, and the above determination is made based on this flag. When the energy-saving mode is inactive (step S10; NO), the energy-saving control section 24 returns to the determination process of step S10 (return).

When the energy-saving mode is active (step S10; YES), the energy-saving control section 24 obtains the current status from the Switch/PHY circuit 18 (step S11). Specifically, the energy-saving control section 24 obtains information relating to the communication volume from the Switch/PHY circuit 18, and based on this, the current communication rate is calculated. For example, the current communication volume is determined as "xx Mbps," and this communication volume is calculated for the percentage with respect to the allowable maximum communication volume (e.g., 100 Mbps) in the communication device 1. For example, when the current communication volume is 40 Mbps and the allowable maximum communication volume is 100 Mbps, the communication rate is 40%. The setting of this communication volume is pre-set by, for example, a firmware implemented in the communication device 1 and stored in the setting storage section 25.

Next, the energy-saving control section 24 determines whether or not the status at that point is an "energy-saving mode activation standby" status (step S12). If the status is in an "energy-saving mode activation standby" status (step S12; YES), the energy-saving control section 24 determines whether or not to activate the energy-saving mode (step S13). Specifically, when the communication rate calculated in step S11 is lower than the pre-set activation threshold value (first threshold value), the energy-saving control section 24 performs a determination with respect to activating the energy-saving mode. The "activation threshold value" refers to a reference value for activating the energy-saving mode when the communication rate decreases, and this is a value that is set appropriately. This activation threshold value, for example, may be set to a value of about 40%. When the communication rate falls below the activation threshold value, this event causes an "activation event occurrence" (see FIG. 2). Moreover, a determination of an "activation event occurrence" may be made after a lapse of a predetermined time from the point when the communication rate falls below the activation threshold value. Specific examples will be described later.

When the energy-saving mode is to be activated (step S13; YES), the energy-saving control section 24 outputs a control signal for turning off the light of each LED of the status indicating section 12 to the LED driving section 20 (step S14). Thus, the energy-saving control section 24 activates the energy-saving mode. A more specific example of a control for turning off the light of each LED of the status indicating section 12 will be described hereafter.

When an activation of the energy-saving mode is not required (step S13; NO), the energy-saving control section 24 returns to the determination process of step S10 (return).

On the other hand, in the above-mentioned step S12, when the status at that point is an "energy-saving mode in operation" status (step S12; NO), the energy-saving control section 24 determines whether or not it is necessary to release the energy-saving mode (step S15). Specifically, when the communication rate calculated in step S11 is higher than the pre-set release threshold value (second threshold value), the energy-saving control section 24 performs a determination with respect to releasing the energy-saving mode. The "release threshold value" refers to a reference value for releasing the energy-saving mode when the communication rate increases, which is a value that is set appropriately. This release threshold value, for example, may be set to a value of about 50-60%. When the communication rate exceeds the release threshold value, this event causes a "release event occurrence" (see FIG. 2).

It is noted that the energy-saving control section 24 may detect the change in link status (link-up/link-down) based on the current status obtained from the Switch/PHY circuit 18, and when change in a link status occurs, a determination of a "release event occurrence" may be made.

Each value of the above-mentioned activation threshold value and release threshold value may be set appropriately. For example, both values may be the same. More preferably, the release threshold value is larger than the activation threshold value. Therefore, even when the communication rate rises and falls at a value close to the activation threshold value, the release event does not occur as long as the communication rate does not go beyond the release threshold value. Thus, a frequent repetition of activation/release of the energy-saving mode can be avoided.

When the energy-saving mode is to be released (step S15; YES), the energy-saving control section 24 outputs the control signal for turning off the light of each LED of the status indicating section 12 to the LED driving section 20 (step S14). Thus, the energy-saving control section 24 releases the energy-saving mode. A more specific example of a control for turning off the light of each LED of the status indicating section 12 will be described hereafter.

When a release of the energy-saving mode is not required (step S15; NO), the energy-saving control section 24 returns to the determination process of step S10 (return).

In the aforementioned serial process, when the Switch/PHY circuit 18 is holding the communication volume in a communication in a format such as by the number of bytes, this number of bytes, etc. may be obtained as the current status. In that case, when a predetermined number of bytes per unit time (e.g., for 1 sec.) is received, the status may be configured to be changed. Specifically, the activation threshold value (first threshold value) and release threshold value (second threshold value) are set, respectively, by, e.g., the number of bytes.

Figure 6:
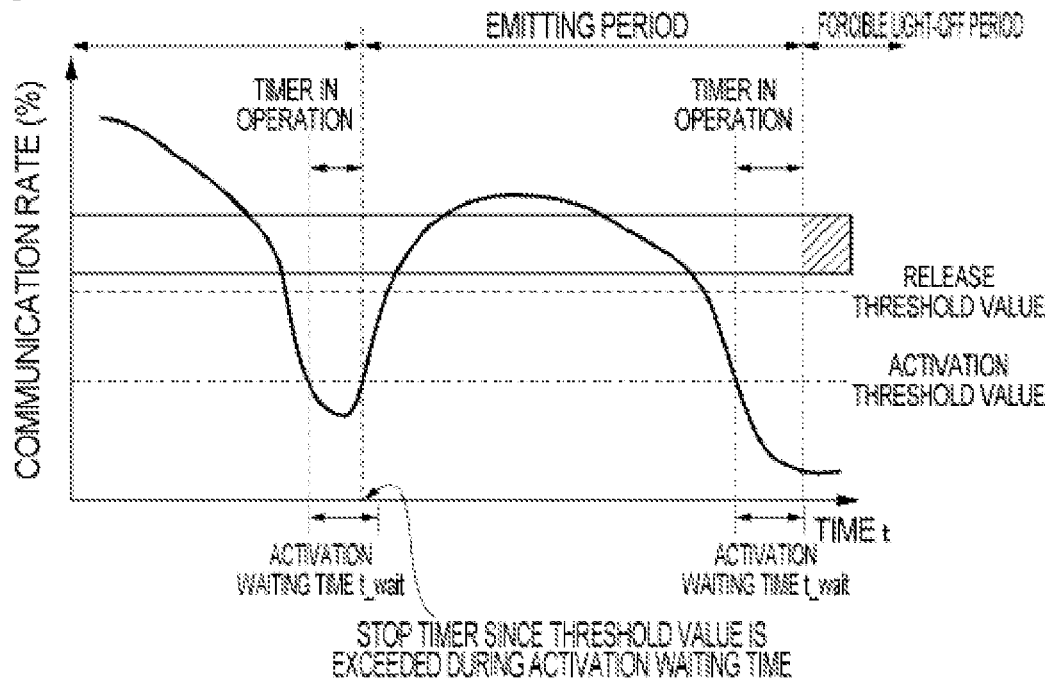
FIG. 6 is a diagram explaining the relationship between the communication rate and the energy-saving mode.

Next, the relationship between the communication rate and the energy-saving mode will be described with reference to FIGS. 4-6. In each diagram, the vertical axis corresponds to the communication rate (%) and the horizontal axis corresponds to time (t). Each diagram shows an example of a shift in the communication rate and a transition status of activation/release of the energy-saving mode corresponding thereto.

In an example shown in FIG. 4, a forcible turn-off period may be entered immediately at the point when the communication rate falls below the activation threshold value, but as shown in the drawing, the forcible turn-off period may also be entered after a lapse of a predetermined waiting time t_wait (hereinafter referred to as the "activation waiting time"). In such a case, the energy-saving control section 24 starts the timer at the point when the communication rate falls below the activation threshold value (corresponding to "timer in operation" in the drawing), and after the timer reaches the above-mentioned activation waiting time, a control for turning off the light of each LED of the status indicating section 12 is performed. Then, the energy-saving control section 24 releases the forcible light-off period at the point when the communication rate exceeds the release threshold value such that the light of each LED of the status indicating section 12 is turned on as normal (emitting period). In the beginning, the light of each LED of the status indicating section 12 is turned on as normal (emitting period). When the communication rate falls below the activation threshold value at a certain point, the energy-saving mode is activated as described above, and the light of each LED of the status indicating section 12 is forcibly turned off (forcible light-off period).

Also in an example shown in FIG. 5, in the beginning, the light of each LED of the status indicating section 12 is turned on as normal (emitting period), and when the communication rate falls below the activation threshold value at a certain point, the energy-saving control section 24 activates the timer to measure the activation waiting time. However, if a change in link status is detected before a lapse of the activation waiting time t_wait, using this as a trigger, the energy-saving control section 24 resets the timer to 0 (reset of timer). After the timer reset, since the communication rate is still below the activation threshold value at that point, the energy-saving control section 24 activates the timer again. Then, after a lapse of the predetermined activation waiting time t_wait, similar to the example in the above-mentioned FIG. 4, the energy-saving control section 24 performs a control for turning off the light of each LED of the status indicating section 12. Then, the energy-saving control section 24 releases the forcible turn-off period at the point when the communication rate exceeds the release threshold value such that the light of each LED of the status indicating section 12 is turned on as normal.

Also in an example shown in FIG. 6, in the beginning, the light of each LED of the status indicating section 12 is turned on as normal (emitting period), and when the communication rate falls below the activation threshold value at a certain point, the energy-saving control section 24 activates the timer to measure the activation waiting time. However, since the communication rate exceeded the release threshold value before a lapse of the activation waiting time t_wait, using this as a trigger, the energy-saving control section 24 resets the timer to 0 (reset of timer). Therefore, the light of each LED of the status indicating section 12 continues to be turned on. After the timer reset, since the communication rate exceeds the activation threshold value for a while, the energy-saving control section 24 does not perform an energy-saving control. The timer is activated again. Then, since the communication rate falls below the activation threshold value at a certain point, the energy-saving control section 24 activates the timer to measure the activation waiting time. Since the communication rate was still low even after a lapse of a predetermined activation waiting time t_wait, similar to the above-mentioned example in FIG. 4, the energy-saving control section 24 performs a control for turning off the light of each LED of the status indicating section 12.

Next, a circuit configuration example for realizing the control for turning off the light of each LED of the status indicating section 12 will be explained with reference to FIG. 7. Like symbols are provided to those that are common with the configuration shown in the above-mentioned FIG. 1, and a detailed description with respect thereto will be omitted.

Figure 7:
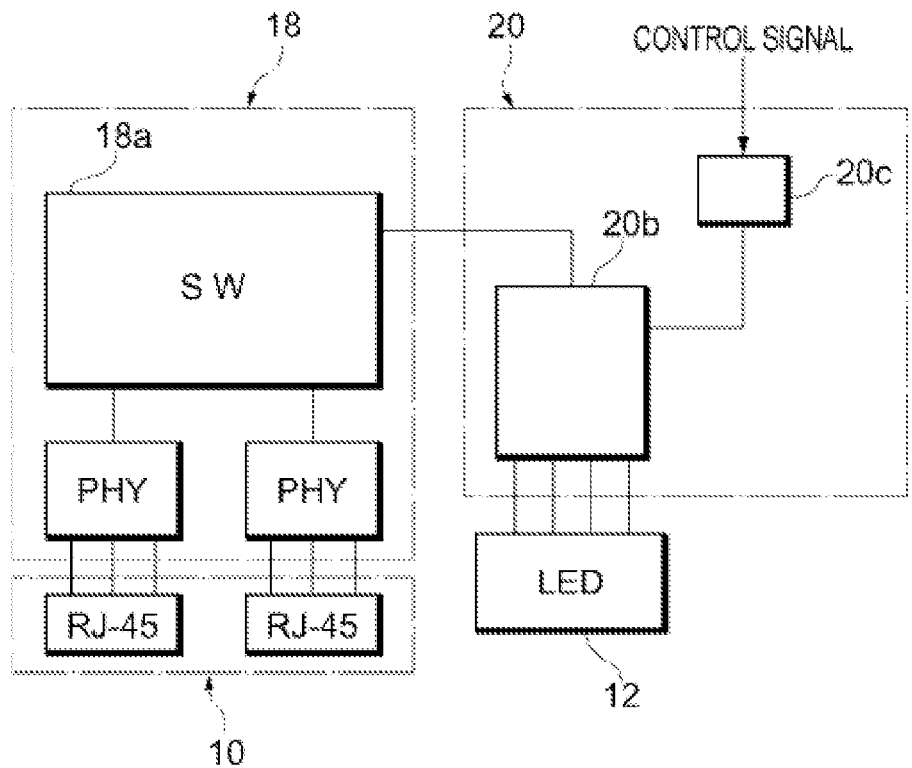
FIG. 7 is a diagram explaining a circuit configuration example for realizing the control for turning off the light of each LED of the status indicating section.

In the circuit configuration example shown in FIG. 7, a driver chip 20b and on/off pin 20c correspond to the above-mentioned "LED driving section 20." A switching chip (SW) 18a outputs turn-on data for turning on the light of each LED of the status indicating section 12 by serial data. The driver chip 20b converts the serial data outputted from the switching chip 18a to parallel data, and further performs a digital/analog conversion to generate a drive signal. This drive signal is supplied to the status indicating section 12 to turn on the light of each LED. The above-mentioned on/off pin 20c is provided to the driver chip 20b. The driver chip 20b controls the luminance of each LED of the status indicating section 12 based on the control signal outputted from the energy-saving control section 24 to the on/off pin 20c. Specifically, the luminance of each LED is adjusted by controlling the amplitude of the above-mentioned drive signal (signal intensity).

According to the communication device of this embodiment as described above, in response to when the communication status is changed (e.g., when the communication rate is decreased), the light of each LED of the status indicating section is turned off or a relatively low luminance is set such that a power-saving of the communication device is possible.

Moreover, this invention is not limited only to the content in the above-mentioned embodiment, but can be carried out with various modifications within the scope of content of this invention. For example, a switching hub has been mentioned as an example of a communication device, but the communication device according to this invention is not limited thereto. This invention is applicable to various devices such as a router.

What is claimed is:

1. A communication apparatus comprising:
   one or more communication ports;
   a communication monitoring section that monitors information communication through the one or more communication ports;
   a status indicating section including one or more status indicators;
   a status indicator driving section that controls a drive signal to be supplied to the status indicating section based on a communication status detected by the communication monitoring section; and
   a lighting control section that starts a timer at a point when a communication rate of the communication status obtained by the communication monitoring section falls below a pre-set activation threshold value, wherein the lighting control section resets the timer to a reset value when a change in link status of the communication status is detected while the timer is within a predetermined activation waiting time, outputs a first control command to the status indicator driving section when the timer exceeds the activation waiting time, and outputs a second control command to the status indicator driving section at the point when the communication rate of the communication status exceeds a pre-set release threshold value,
   wherein the status indicator driving section controls the drive signal so as to turn off a light of the status indicator when the first control command is provided from the lighting control section and controls the drive signal so as to turn on the light of the state indicator when the second control command is provided from the lighting control section.

2. The communication apparatus according to claim 1, wherein the release threshold value is higher than the activation threshold value.

3. The communication apparatus according to claim 1, wherein the lighting control section resets the timer to 0 when the link status of the communication status changes from a status in which a link-down is detected to a status in which a link-up is detected when the timer is within the activation waiting time.

4. The communication apparatus of claim 1, wherein the reset value is 0.

5. A driving method of a status indicating section in a communication apparatus comprising one or more communication ports, a communication monitoring section that monitors information communication through the one or more communication ports and a status indicating section including one or more status indicators, the method comprising:
   obtaining the communication status from the communication monitoring section;
   starting a timer at a point when a communication rate of the communication status falls below a pre-set activation threshold value, and
   resetting the timer to a reset value when a change in link status of the communication status is detected while the timer is within a predetermined activation waiting time, and controlling a drive signal to be supplied to the status indicating section so as to turn off a light of the status indicator when the timer exceeds the activation waiting time, and further controlling a drive signal to be supplied to the status indicating section so as to turn on the light of the status indicator at the point when the communication rate of the communication status exceeds a pre-set release threshold value is controlled.

6. The driving method of claim 5, wherein the reset value is 0.

7. A driving method of a status indicating section in a communication apparatus comprising one or more communication ports, a communication monitoring section that monitors an information communication through the one or more communication ports, a status indicating section including one or more status indicators, a status indicator driving section that drives the status indicating section and a lighting control section that outputs a control command to the status indicator driving section, the method comprising:
   a first step of the status indicator driving section controlling a drive signal to be supplied to the status indicating section based on a communication status detected by the communication monitoring section;
   a second step of the lighting control section starting a timer at a point when a communication rate of the communication status obtained by the communication monitoring section falls below a pre-set activation threshold value, wherein when a change in link status of the communication status is detected when the timer is within a predetermined activation waiting time, the timer resets to a reset value, and when the timer exceeds the activation waiting time, a first control command is outputted to the status indicator driving section;

a third step of the status indicator driving section controlling the drive signal so as to turn off a light of the status indicator when the first control command is provided from the lighting control section;

a fourth step of the lighting control section outputting a second control command to the status indicator driving section at the point when the communication rate of the communication status exceeds a pre-set release threshold value; and a fifth step of the status indicator driving section controlling the drive signal so as to turn on the light of the status indicator when the second control command is provided from the lighting control section.

8. The driving method of claim 7, wherein the reset value is 0.

* * * * *